(12) United States Patent  (10) Patent No.: US 8,777,702 B2
DeVries et al.  (45) Date of Patent: Jul. 15, 2014

(54) STUFFING TUBE MOUNTING ASSEMBLY AND FOLLOWER

(75) Inventors: Kevin DeVries, Monroe, IA (US); Kenneth B. Arnote, Jr., Albion, IA (US); Timothy V. Weers, Urbandale, IA (US)

(73) Assignee: Marel Meat Processing Inc., Des Moines, IA (US)

( * ) Notice: Subject to any disclaimer, the term of this patent is extended or adjusted under 35 U.S.C. 154(b) by 454 days.

(21) Appl. No.: 13/179,950

(22) Filed: Jul. 11, 2011

(65) Prior Publication Data

US 2013/0017770 A1  Jan. 17, 2013

(51) Int. Cl.
    *A22C 11/00* (2006.01)
(52) U.S. Cl.
    USPC .......................................................... 452/45
(58) Field of Classification Search
    USPC ................................... 452/30–35, 46–48, 51
    See application file for complete search history.

(56) References Cited

U.S. PATENT DOCUMENTS

| 888,305 | A | | 5/1908 | Bussinger |
| 990,547 | A | | 4/1911 | Gunuskey |
| 3,091,799 | A | * | 6/1963 | Cieri ................................ 452/45 |
| 3,473,190 | A | * | 10/1969 | Kielsmeier et al. ............. 452/45 |
| 3,739,427 | A | * | 6/1973 | Niedecker ....................... 452/35 |
| 4,893,377 | A | * | 1/1990 | Evans et al. ..................... 452/34 |
| 5,332,267 | A | * | 7/1994 | Harrison ......................... 285/23 |
| 5,503,438 | A | * | 4/1996 | Swauger .................... 285/332.2 |
| 5,916,019 | A | | 6/1999 | Whittlesey |
| 6,056,634 | A | * | 5/2000 | Schwarz et al. ................ 452/27 |
| 6,135,870 | A | | 10/2000 | Hamblin et al. |
| 6,315,653 | B1 | | 11/2001 | Ciancitto |
| 6,729,659 | B2 | * | 5/2004 | Schroeder et al. ......... 285/334.5 |
| 7,867,068 | B2 | * | 1/2011 | Whittlesey et al. ............. 452/37 |
| 7,955,164 | B2 | * | 6/2011 | Wince et al. .................... 452/30 |
| 7,976,366 | B2 | * | 7/2011 | Whittlesey et al. ............. 452/45 |
| 2005/0053699 | A1 | | 3/2005 | Whittlesey et al. |

FOREIGN PATENT DOCUMENTS

CH  543236 A  10/1973
DE  8701006 U1  3/1987

* cited by examiner

*Primary Examiner* — Richard Price, Jr.
(74) *Attorney, Agent, or Firm* — Zarley Law Firm, P.L.C.

(57) ABSTRACT

A stuffing tube mounting assembly and follower includes an elongated member with a tapered portion at one end that fits within a tapered end of a stuffing horn. The stuffing horn is inserted through a bore of a collar. The bore of the collar has a tapered section that engages the tapered end of the horn when the collar is attached to the member. The follower has a housing having a bore. An opening in a sidewall of the housing is in communication with the bore. Disposed within the bore is a wiper. A cap having a central opening in an end wall is attached to the housing.

25 Claims, 4 Drawing Sheets

STUFFING TUBE MOUNTING ASSEMBLY AND FOLLOWER

BACKGROUND OF THE INVENTION

This invention is directed to a mounting assembly for a stuffing horn and follower for a cylinder.

Elongated hollow stuffing tubes are well-known in the art. The tubes serve as a conduit upon which a hollow elongated casing material is mounted and through which meat emulsion is pumped for delivery into the casing. The attachment of a stuffing tube for operation has created challenges in the past which initially were addressed in U.S. Pat. Nos. 6,135,870 and 6,315,653 incorporated herein by reference in their entirety. While these patents represented an improvement, challenges still remained as the stuffing tube mounting assemblies were designed to match only one size of stuffing tube. To replace the tube was time consuming.

In addition, when the stuffing tube would be moved by an air cylinder, meat emulsion would build up on the cylinder affecting operation and requiring cleaning. Accordingly, a need exists in the art for a device that addressed these deficiencies.

Therefore, an objective of this invention is to provide a mounting assembly that accommodates different sizes of stuffing horns.

Another objective of this invention is to provide a mounting assembly that allows for greater speed and ease in substituting stuffing horns.

A still further objective of this invention is to provide a follower that reduces and/or eliminates the build-up of meat emulsion inside a cylinder.

These and other objectives will be apparent to one of skill in the art based on the following written description, drawings, and claims.

SUMMARY OF THE INVENTION

A stuffing tube mounting assembly and follower includes an elongated member with a tapered portion at one end that fits within a tapered end of a stuffing horn. The stuffing horn is inserted through a bore of a collar. The bore of the collar has a tapered section that engages the tapered end of the horn when the collar is attached to the member.

The follower has a housing having a bore. An opening in a sidewall of the housing is in communication with the bore. Disposed within the bore is a wiper. A cap having a central opening in an end wall is attached to the housing.

DETAILED DESCRIPTION OF THE PREFERRED EMBODIMENT

Figure 1:
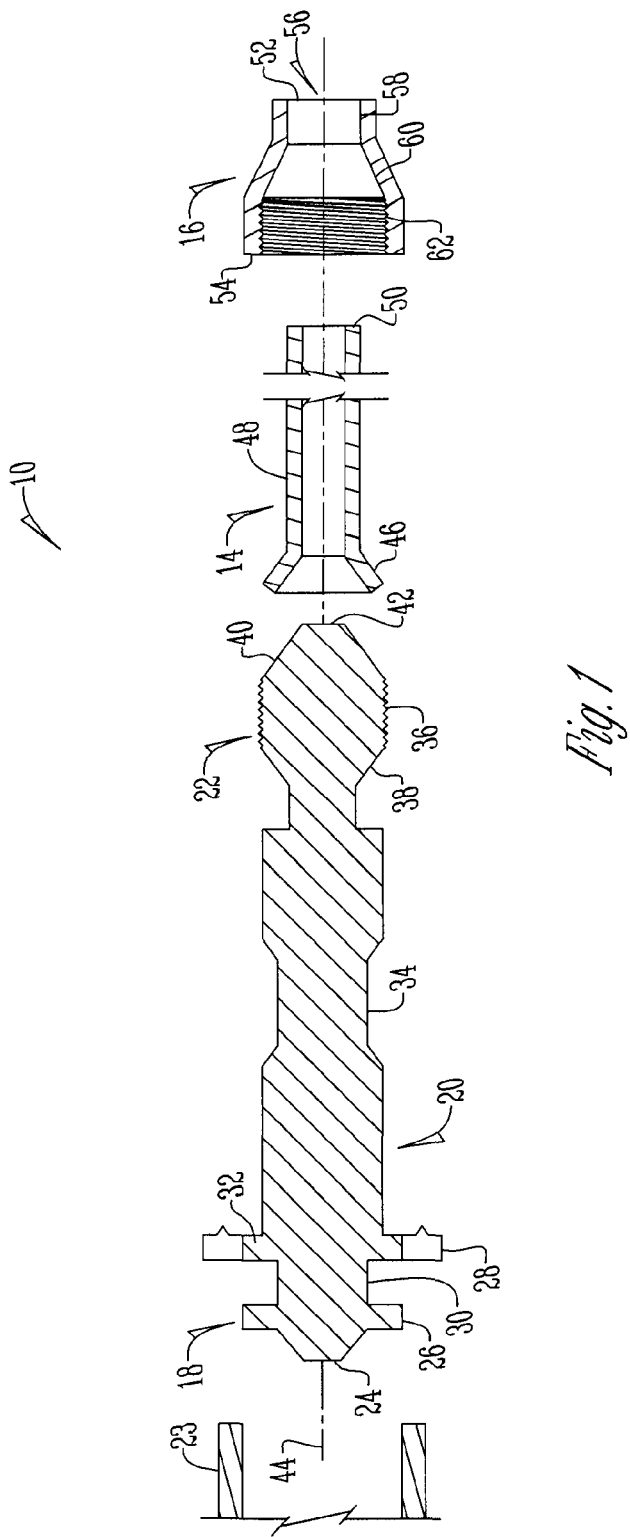
FIG. 1 is an exploded sectional view of a mounting assembly.
Figure 2:
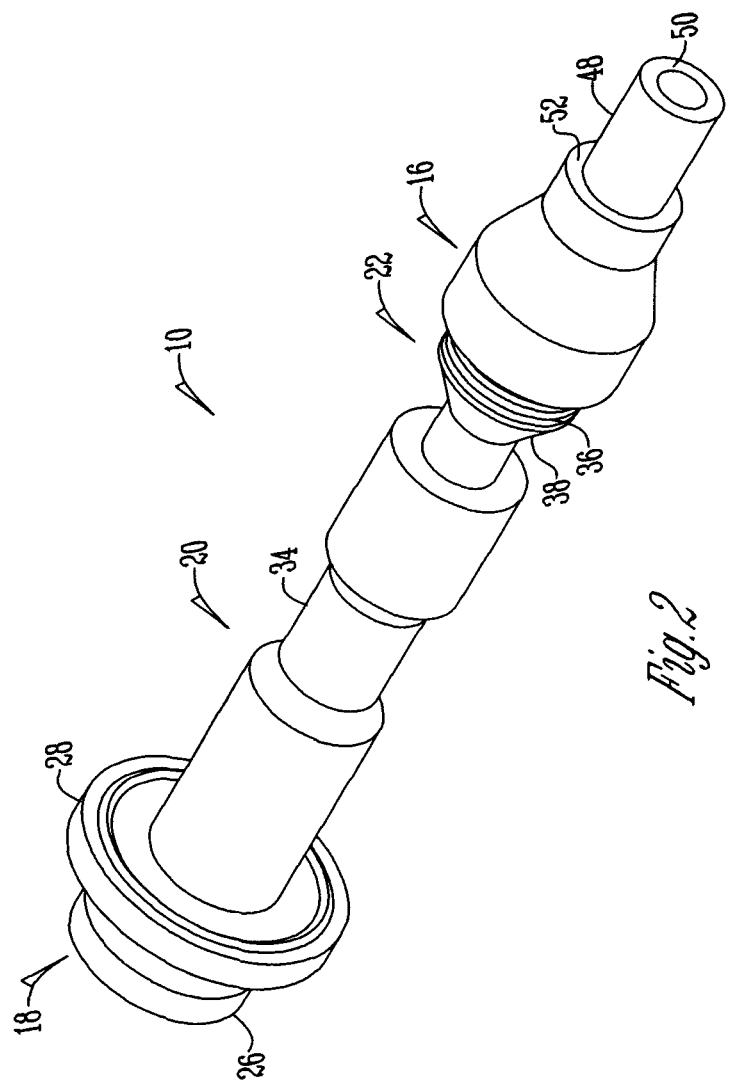
FIG. 2 is a perspective view of a mounting assembly.
Figure 3:
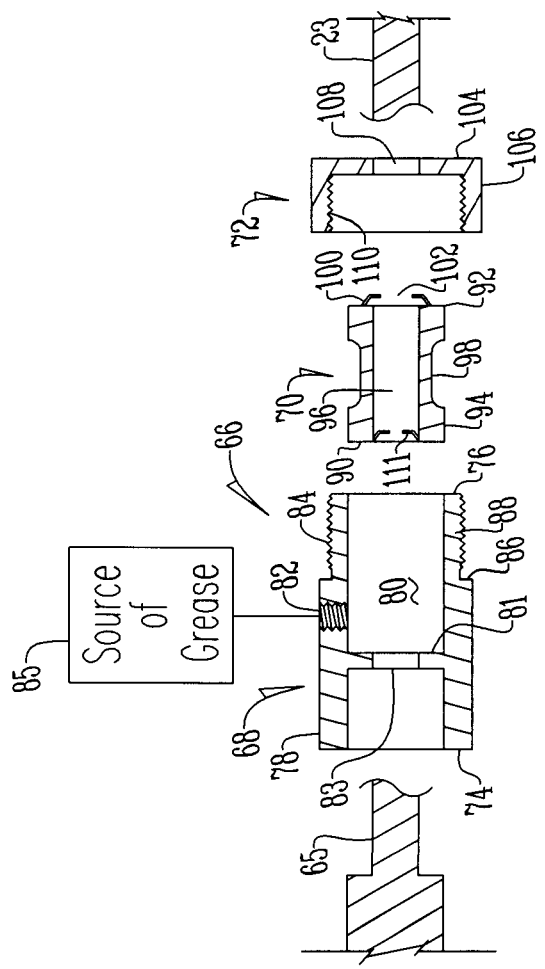
FIG. 3 is an exploded sectional view of a follower.
Figure 4:
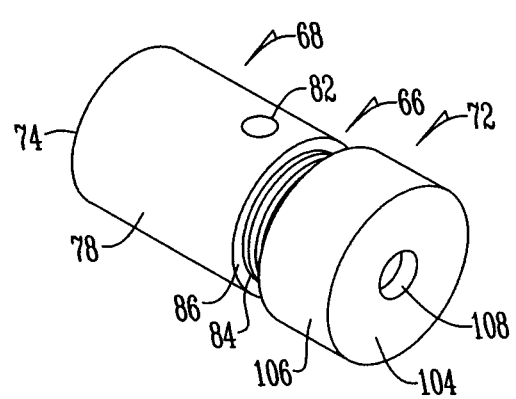
FIG. 4 is a perspective view of a follower.

Referring to the Figures, a stuffing tube mounting assembly 10 includes an elongated member 12, a stuffing horn 14, and a collar 16. The elongated member 12 has a first section 18, an intermediate section 20, and a second section 22. The first section is designed for connection to the air cylinder 23 for moving the mounting assembly in a longitudinal direction. Preferably, the first section 18 has an end 24 that tapers outwardly from the end 24 and terminates at first connecting flange 26. The connecting flange 26 is separated from a second flange 28 by an elongated section 30. Preferably, the second flange 28 is greater in diameter than the first flange 26 and has flat surfaces 32 for gripping with a vice.

Extending outwardly and away from the second flange 28 is the intermediate section 20 of the elongated member 12.

Preferably, the intermediate section 20 is generally cylindrical with indented flat surfaces 34 that are used for gripping with a wrench.

Extending outwardly and away from the intermediate section 20 is the second section 22. Preferably, the second section 22 has a central threaded portion 36 with no physical stops beside the taper, a first tapered portion 38 that tapers outwardly from the intermediate section 20 toward the central portion 36, and a second tapered portion 40 that tapers inwardly from the central portion 36 toward end 42. The first section 18 and second section 22 have outer surfaces concentric with the longitudinal center axis 44 of the elongated member 12.

The stuffing horn 14 is hollow and has a tapered portion 46 that tapers outwardly from the primary portion 48 of the horn 14 toward a connecting end 50. The angle of the taper of tapered portion 46 is similar to the angle of tapered portion 40 such that portion 46 fits over and engages portion 40 along the tapered surface.

The collar 16 has a first end 52, a second end 54, and a concentric bore 56 that extends longitudinally therethrough. The bore has a first section 58 that has a diameter larger than the stuffing horn 14. Extending away and tapering outwardly from the first section 58 is a second section 60 of the bore 56. Preferably, the angle of the taper of section 60 of the bore 56 is similar to the angle of the tapered portion 46 of the stuffing horn such that the second section 60 of bore 56 fits over and engages portion 46 along the tapered surface. The second section 60 terminates in a threaded third section 62 of bore 56. The third section 62 has a diameter slightly larger than the diameter of central portion 36 of the elongated member 12 such that the third section 62 of the bore 56 is threadably received upon the central portion 36 of the elongated member 12.

To assemble, the end opposite the connecting end 50 of the stuffing horn 14 is inserted through bore 56 of the collar 16. The collar is moved along the length of the primary portion 48 of the stuffing horn 14 until the collar 16 reaches the tapered portion 46 of the stuffing horn 14. Next, the tapered portion 40 of the second section 22 of member 12 is inserted into tapered portion 46 of stuffing horn 14 such that the outer surface of portion 40 engages the inner surface of portion 46. The collar 16 is then threadably connected to the second section 22 by the threads of the third section 62 of the collar 16 are received by the threaded portion 36 of the second section 22. As the collar 16 is connected to the second section 22, the second section 60 of the collar and the tapered portion 40 of the second section are drawn into engagement with tapered portion 46 of the stuffing horn 14 to create a seal.

The stuffing horn 14 is longitudinally moveable by a horn adjustment assembly that includes a cylinder 65 that extends through a follower 66. Preferably, the follower has a housing 68, an insert 70, and a cap 72. The housing has a first end 74, a second end 76, a sidewall 78, and a bore 80 that generally extends through the central axis of the housing 68 from the first end 74 to the second end 76. Positioned within the bore 80 is a transversely extending shelf 81 that has an opening 83 with a diameter less than the diameter of guide cylinder 23. The sidewall 78 has at least one opening 82 that extends from the outer perimeter of the sidewall 78 to bore 80. The opening 82 is connected to and in communication with a source of pressurized grease 85. The sidewall 78 has a reduced area 84 that forms a shoulder 86. Extending outwardly from shoulder 86 is a threaded stem 88.

The insert 70 has a first end 90, a second end 92, a sidewall 94, and a bore 96 that is generally centrally located. The sidewall 94 has at least one and preferably multiple openings 98. The sidewall 94 also has a diameter less than the diameter of bore 80. Attached to the second end 92 of the insert 70 is a wiper 100. Preferably the wiper 100 is mounted within bore 96, is made of a pliable material such as rubber or the like, and has a central opening 102. Alternatively, the wiper is mounted to stem 88.

The cap 72 has an end wall 104 and a sidewall 106. The end wall has a generally centrally located opening 108 that has a diameter smaller than the diameter of the insert. The sidewall 106 has a threaded inner surface 110 that is threadably received on the threaded stem 88 of the housing 68.

To assemble, the insert 70 is inserted into bore 80 at the second end of the housing 68 until the first end 90 of the insert 70 engages shelf 81. Once inserted, the cap 72 is threadably attached to the housing 68 such that opening 83 of the shelf 81, bore 96 of the insert 70, and opening 102 of the wiper 100 are in alignment. The follower 66 is then positioned such that cylinder 65 is inserted through openings 83, bore 96 and opening 102.

Once assembled, grease is supplied to the follower 66 from the source of pressurized grease 85. The grease flows from its source 85 through opening 82 and into bore 80. From bore 80 the grease flows through openings 98 of the insert and onto the cylinder 65. As the cylinder 65 is slid toward the stuffing horn 14 the grease on the cylinder 65 resists the build up of meat. As the cylinder 65 is pulled away from the stuffing horn 14, any meat left on the cylinder is removed by the wiper 100. A wiper 111 alternatively and/or additionally is mounted at end 90 of insert 70 to prevent grease from entering cylinder 65.

Accordingly, a stuffing tube mounting assembly and follower have been disclosed that, at the very least, meet the stated objectives.

What is claimed is:

1. A stuffing tube mounting assembly, comprising:
   an elongated member having a first section, a second section and an intermediate section wherein the second section has a tapered portion that extends from the intermediate section to an end of the second section;
   a stuffing horn having a tapered portion on one end that fits over the tapered portion of the second section; and
   a collar having a bore through which the stuffing horn is inserted and a tapered section having an angle similar to an angle of the tapered portion of the stuffing tube such that the tapered portion of the collar fits over and engages the tapered portion of the stuffing horn.

2. The assembly of claim 1 wherein the collar is threadably connected to the elongated member.

3. The assembly of claim 1 wherein the connection of the collar to the elongated member creates a seal between the elongated member, the stuffing horn, and the collar.

4. The assembly of claim 1 wherein the first section of the elongated member has an end that terminates at a first connecting flange.

5. The assembly of claim 4 wherein the connecting flange is separated from a second flange by an elongated section.

6. The assembly of claim 5 wherein the diameter of the second flange is greater than the diameter of the connecting flange.

7. The assembly of claim 1 wherein the intermediate section has indented flat surfaces.

8. The assembly of claim 1 wherein the second section has central threaded portion, a first tapered portion that extends outwardly from the intermediate section.

9. A follower for a stuffing horn assembly, comprising:
   a housing having a generally centrally located bore;
   a wiper disposed within the bore, and
   a cap having a generally centrally located opening connected to the housing.

10. The follower of claim 9 wherein the housing has an opening in a sidewall that extends into and is in communication with the bore.

11. The follower of claim 10 further comprising a source of pressurized material connected to the opening in the sidewall of the housing.

12. The follower of claim 11 wherein the pressurized material is grease.

13. The follower of claim 9 wherein the wiper is attached to an insert that is received within the bore.

14. The follower of claim 13 wherein the insert has a generally centrally located bore and at least one opening in a sidewall of the insert.

15. The follower of claim 9 wherein the cap is threadably connected to the housing.

16. The follower of claim 9 further comprising a shelf positioned within the bore of the housing that has an opening therein.

17. The follower of claim 9 wherein the wiper is formed of a pliable material.

18. The follower of claim 9 wherein the wiper is connected to an end of an insert.

19. The follower of claim 9 wherein the wiper is positioned within a bore of an insert.

20. The follower of claim 9 further comprising a second wiper disposed within the bore.

21. The follower of claim 9 further comprising a second wiper connected to an insert disposed within the bore of the housing.

22. The follower of 9 wherein when the cap is connected to the housing an insert is held within the bore of the housing.

23. A follower for a stuffing horn assembly, comprising:
   a housing having a generally centrally located bore;
   a first wiper connected to the housing and positioned within the bore, and
   a cap having a generally centrally located opening connected to the housing.

24. The follower of claim 23 wherein the first wiper is connected to an insert positioned within the bore.

25. The follower of claim 24 wherein when the cap is connected to the housing the insert is held within the bore of the housing.

* * * * *